United States Patent [19]

Morisawa

[11] 4,326,816

[45] Apr. 27, 1982

[54] TRANSMISSION SUPPORT ASSEMBLY IN VEHICLE

[75] Inventor: Kunio Morisawa, Toyota, Japan

[73] Assignee: Toyota Jidosha Kogyo Kabushiki Kaisha, Toyota, Japan

[21] Appl. No.: 153,949

[22] Filed: May 28, 1980

[30] Foreign Application Priority Data

Jun. 26, 1979 [JP] Japan ............................ 54-79680

[51] Int. Cl.³ ........................... F16D 1/00; F16J 1/38
[52] U.S. Cl. ................................. 403/228; 248/634; 267/141.1
[58] Field of Search .............. 403/220, 225, 228, 243; 248/634; 267/141.1, 141.2, 141.3, 141.7

[56] References Cited

U.S. PATENT DOCUMENTS

| Re. 19,016 | 12/1933 | Whitehouse | 267/141.2 |
| 917,530 | 4/1909 | Boyce | 411/123 |
| 1,206,793 | 12/1916 | Austin | 411/123 |
| 1,621,854 | 3/1927 | Saloun | 411/123 |
| 1,657,949 | 1/1928 | Wilson | 411/123 |
| 2,913,199 | 11/1959 | Bodeau et al. | 267/141.2 |

Primary Examiner—Wayne L. Shedd
Attorney, Agent, or Firm—Finnegan, Henderson, Farabow, Garrett & Dunner

[57] ABSTRACT

A housing member for a transmission in a vehicle has an axially extending columnar portion having a non-circular cross-section. A rear mount is fitted on the columnar portion. The rear mount is kept from slipping off the columnar portion by a first lock washer fastened to the end of the columnar portion. The lock washer includes a first annular piece fitted on the columnar portion and a second annular piece having a diameter larger than that of the columnar portion. A second lock washer is arranged for preventing a bolt for fastening from loosening. The second lock washer has at least two tabs respectively engaging the bolt head and the first lock washer.

6 Claims, 4 Drawing Figures

TRANSMISSION SUPPORT ASSEMBLY IN VEHICLE

BACKGROUND OF THE INVENTION

1. Field of the Invention

This invention relates to a device for supporting a transmission housing on a chassis of a vehicle.

2. Description of the Prior Art

With a view to preventing a transmission-support rear mount from slipping off a columnar portion or a shaft-like portion extending from one end of the transmission housing, a washer of a given size has hitherto been utilized. Such a washer has been attached to the end face of the columnar portion by means of a bolt. The bolt, however, is likely to loosen so that the rear mount slips off the columnar portion, with the failure to support the transmission, thus leading to damage of a vehicle during the running thereof.

SUMMARY OF THE INVENTION

It is accordingly an object of the present invention to provide a transmission support assembly in a vehicle, wherein a bolt has no likelihood of loosening, thus ensuring support of the transmission.

To attain the object, there is provided according to the present invention a transmission support assembly which comprises; a columnar portion having a non-circular cross-section and axially extending from one end of a transmission housing; a vibration-absorbing mount means force-fitted on said columnar portion; a first lock washer means including a first annular piece in fitting engagement on said columnar portion and a second annular piece having a larger outer diameter than that of said columnar portion and in abutting engagement on the end face of said columnar portion, said first and second annular pieces being joined to each other; a second lock washer means having at least two tabs; and a bolt means having a non-circular head and axially screwed into said columnar portion for fastening said first and second locks washer means to said columnar portion, the tabs of said second lock washer means being bent into engagement respectively with the second annular piece of said first lock washer means and the head of said bolt for preventing relative rotation.

The relative rotation of the bolt to the columnar portion is thus impeded, and the bolt by no means becomes loose, thereby eliminating a risk that the support member slips off the columnar portion.

The second annular piece of the first lock washer is welded at the periphery thereof to the first annular piece. The second annular piece of the lock washer has a notch, in which one of the tabs of the second lock washer is bent into engagement. Another tab of the second lock washer is bent into engagement with a flank of the hexagonal head of the bolt. Moreover, a third tab of the second lock washer is bent into engagement with a corner of the hexagonal head.

The object and other features of the present invention will be more apparent from the description of the ensuing part of the specification and the drawings which indicate a preferred embodiment of the invention.

DESCRIPTION OF THE PREFERRED EMBODIMENTS

Figure 1:
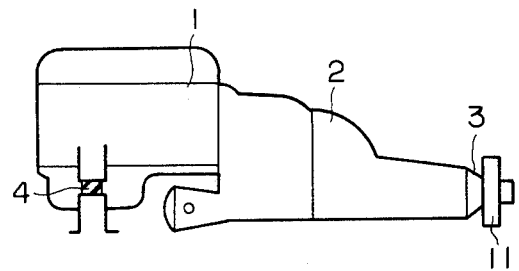
FIG. 1 diagrammatically shows a position of a rear mount.

Referring first to FIG. 1, an engine body 1 and a transmission 2 are attached to each other. The transmission 2 is formed with an extension housing 3 at the end remote from the engine body 1. In the engine body 1 and the transmission 2 which are formed integrally as a body to be supported, the former is supported by front mount 4 and the latter is supported at the extension housing 3 by a vibration absorbing rear mount 11.

Figure 2:
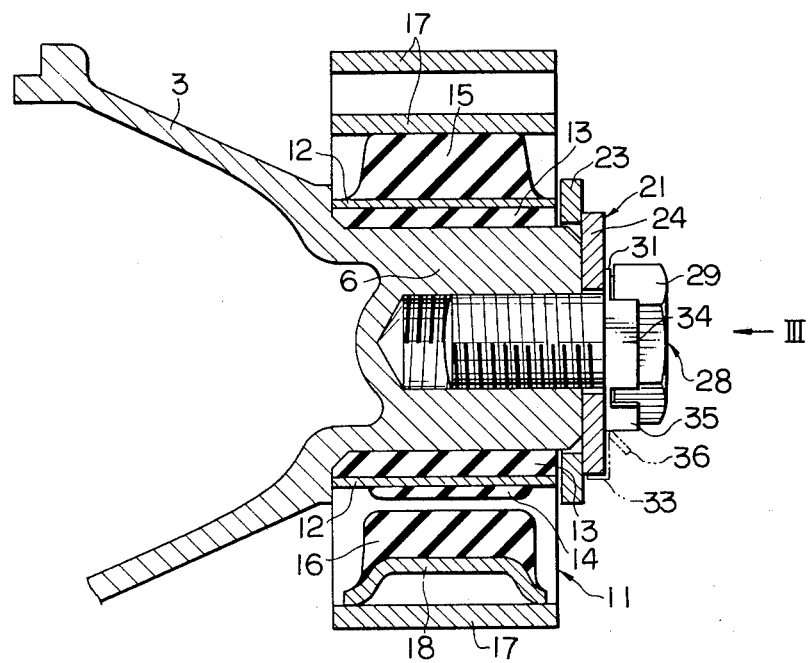
FIG. 2 is a longitudinal cross sectional view of an embodiment of the present invention.
Figure 3:
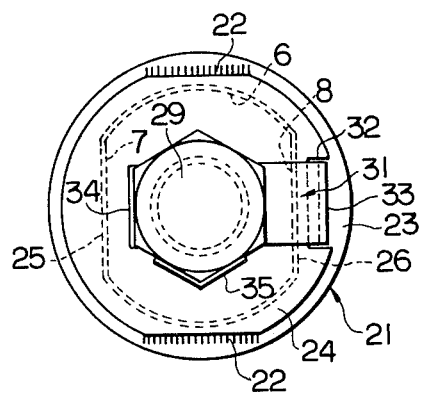
FIG. 3 is a view as seen in the direction of arrow III of FIG. 2.
Figure 4:
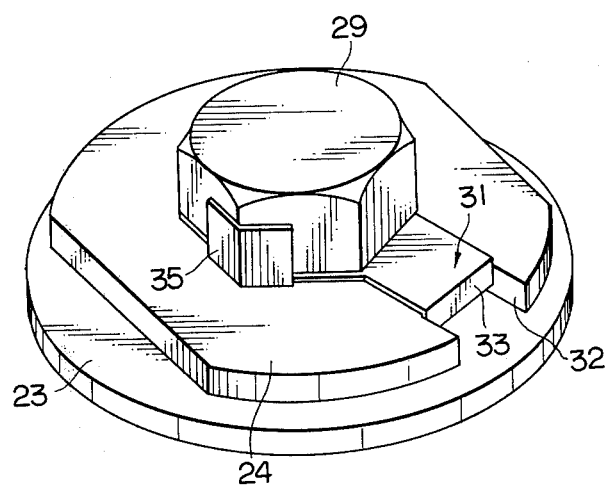
FIG. 4 is a perspective view of a head portion of a bolt.

The rear mount 11 is shown in detail in FIG. 2. The extension housing 3 has a columnar portion or shaft-like portion 6 axially extending a given length from one end thereof and having axially extending flat portions 7 and 8 (FIG. 3) at the opposite side portions thereof.

The rear mount 11 includes a metallic tube 12 having a circular cross section, rubber members 13 and 14 attached to the inner peripheral wall of the metallic tube and the outer peripheral wall thereof, vibration absorbing rubber members 15 and 16, and a frame member 17. The rubber member 16 is supported by a bracket 18 at an axial gap from the rubber member 14. The rear mount 11 is force-fitted on the columnar portion 6.

A first lock washer 21 consists of a larger annular piece 23 and a smaller annular piece 24 which are joined to each other at the portion 22 by the welding. The larger annular piece 23 has an inner peripheral contour conforming to the outer peripheral contour of the columnar portion 6. More specifically, the annular piece 23 has flat portions 25 and 26 in the inner peripheral wall thereof, which portions are in conformity with the flat portions 7 and 8 of the columnar portion 6 so that, when the washer 21 is fitted on the columnar portion 6, the relative rotation between the washer 21 and the columnar portion 6 is impeded. A bolt 28 passing through the washer 21 is screwed to the end face of the columnar portion 6 for fastening the washer 21 to the columnar portion 6. The outer diameter of the annular piece 24 is larger than that of the columnar portion 6. The washer 21, fastened by the bolt 28 to the columnar portion 6, prevents the rear mount 11 from slipping off the columnar portion 6.

Another lock washer 31 is interposed between a hexagonal head portion 29 of the bolt 28 and the smaller annular piece 24, with the bolt 28 passing through the washer. The washer 31 has a tab 33 bent into engagement with a notch 32 in the annular piece 24, another tab 34 engaging the flank of the head portion 29, and a third tab 35 bent into engagement with a corner of the head portion 29.

As is clear from foregoing, the first washer 21 is prevented from rotating relative to the columnar portion 6. On the other hand, the second washer 31 for preventing the bolt 28 from loosening is in engagement with first washer 21 for preventing relative rotation thereof.

Accordingly, once the bolt 28 is tightened, the rear mount 11 is securely kept from slipping off the columnar portion 6.

What is claimed is:

1. A transmission support assembly in a vehicle comprising:
   a columnar portion having a non-circular cross section and axially extending from one end of a transmission housing;
   a vibration-absorbing mount means coaxially force-fitted around said columnar portion;
   a first lock washer means for preventing axial displacement of said mount means, said first lock washer means including a first annular piece in fitting engagement around said columnar portion and a second annular piece having a larger outer diameter than that of said columnar portion and in abutting engagement on the end face of said columnar portion, said first and second annular pieces being joined to each other;
   a second lock washer means having at least two tabs; and
   a bolt means having a non-circular head and axially screwed into said columnar portion for fastening said first and second lock washer means to said columnar portion,
   the tabs of said second lock washer means engaging respectively the second annular piece of said first lock washer means and the head of said bolt for preventing relative rotation.

2. A transmission support assembly as defined in claim 1, wherein the peripheral surface of said columnar portion is flattened and the aperture of the first annular piece of said first lock washer means has a configuration corresponding to the cross section of said columnar portion.

3. A transmission support assembly as defined in claim 2, wherein the second annular piece of said first lock washer means is welded at the periphery thereof to the first annular piece.

4. A transmission support assembly as defined in claim 1, wherein the second annular piece of said lock washer means has a notch in which one of the tabs of said second lock washer means is engaged.

5. A transmission support assembly as defined in claim 1, wherein said bolt has a hexagonal head and another tab of said second lock washer means is engaged with a flank of the hexagonal head of said bolt.

6. A transmission support assembly as defined in claim 1, wherein said bolt has a hexagonal head and also including a third tab of said second lock washer means which is engaged with a corner of the hexagonal head of said bolt.

* * * * *